Nov. 12, 1940.    R. ANDRIEU    2,221,069
SAW TOOTH WAVE GENERATOR
Filed Sept. 15, 1937
Fig. 1
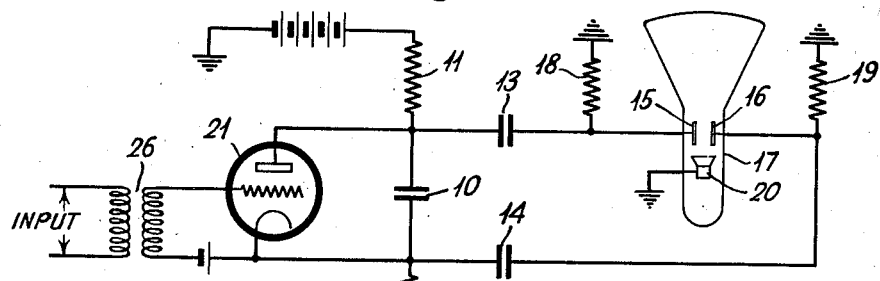
Fig. 2
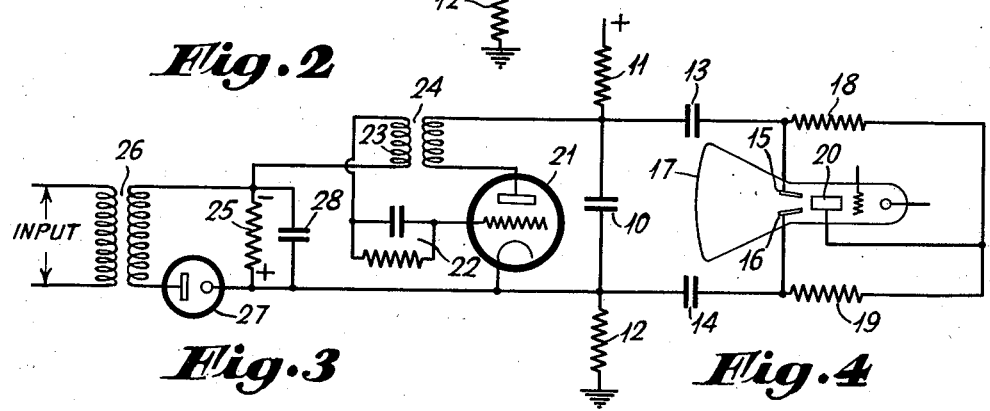
Fig. 3
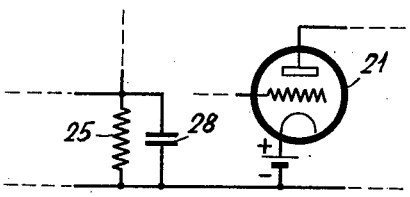
Fig. 4
Fig. 5
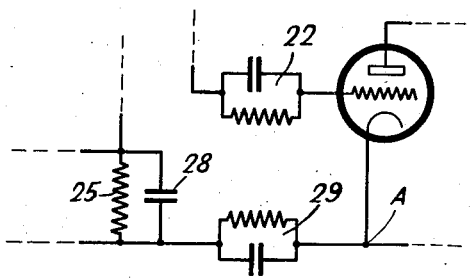
Fig. 6
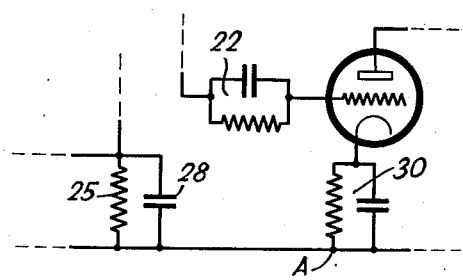
INVENTOR
ROBERT ANDRIEU
BY
ATTORNEY Patented Nov. 12, 1940

2,221,069

UNITED STATES PATENT OFFICE 2,221,069

SAW TOOTH WAVE GENERATOR

Robert Andrieu, Berlin, Germany, assignor to Telefunken Gesellschaft für Drahtlose Telegraphie m. b. H., Berlin, Germany, a corporation of Germany Application September 15, 1937, Serial No. 163,970
In Germany September 9, 1936

2 Claims. (Cl. 178—7.5)

My invention relates broadly to oscillation generators, and more particularly to an arrangement for producing symmetrical saw tooth potentials for controlling cathode ray beams.

In my co-pending application Serial No. 124,977 filed February 10, 1937, there is described a circuit arrangement for producing symmetric, saw tooth shaped voltage curves. According to that application, a condenser is joined to two resistances of substantially equal values, and each of these resistors in turn joins one of the two poles of a source of direct current energy. In parallel relationship to the condenser is connected the filament plate path of a grid controlled discharge tube, and there is applied to the control grid of said tube brief voltage impulses of the frequency of the desired saw tooth potential.

When such a circuit arrangement is employed for receiving television transmissions, in which the picture content and synchronizing impulses are transmitted in that a carrier wave is controlled with the beginning of a finite amplitude value by the picture content in the one direction and by the impulses in the other direction, the question is how the saw tooth generator is to be synchronized. In the arrangement according to my co-pending application hereinbefore referred to, the synchronizing impulses are applied across a transformer. In accordance with the invention, the rectified voltage is to be produced in the grid circuit of the blocking oscillation tube such that the synchronizing impulses excite the blocking oscillator.

My invention will best be understood by reference to the drawing in which

Fig. 1 represents an embodiment in my co-pending application,

Fig. 2 is one embodiment of my invention, and

Figs. 3, 4, 5 and 6 are modifications of the arrangement of Fig. 2.

Referring to Fig. 1, 10 denotes a condenser which by way of two resistances of like value 11 and 12 is united with the positive and negative grounded pole of a source of D. C. voltage. In parallel relationship to the condenser 10 is the filament plate path of a grid controlled discharge tube 21 whose control grid circuit contains a negative biasing source as well as the secondary winding of an input transformer 26. Further in parallel relation to the condenser 10 is a branch circuit which contains the deflector plates 15, 16 of a cathode ray tube 17 as well as two blocking condensers 13 and 14. The two deflection plates are joined or grounded to two resistors 18 and 19, and the anode 20 is grounded.

This arrangement operates in the following manner: As long as the tube 21 is blocked, the upper or the lower plate of the condenser 10 approaches the potential of the positive or negative pole of the D. C. voltage source. Suppose that at a time $t_0$, the two plates are at the potentials $V_o$ and $V_u$, the latter differing from each other by $v$. From the source of D. C. potential, there will then flow by way of the two resistances 11 and 12 a charge current to the condenser which during the incipient part of the charge process may be regarded as presenting time constancy. Hence, the potentials of the two condenser plates are subject to linear voltage with time in the sense that the potential of the upper plate tends towards the potential of the positive pole and the lower plate that of the negative pole of the D. C. source of potential. At an instant $t_1$, the tube 21 is rendered conducting and, as a result, the potential of the positively charged portion of the condenser will drop to a value approximately $V_o$ and the potential of the negatively charged portion of the condenser will rise to a value approximately $V_u$. This rise and fall of potential of the plates will take place during the time the tube is conducting and at an instant $t_2$, the tube 21 is rendered nonconducting and the cycle starts over again. The D. C. component is blocked by the two blocking condensers 18, 19 so that only the saw tooth wave is impressed on the deflecting apparatus of the cathode ray tube 17.

An embodiment of my invention is represented in Fig. 2. A condenser 10 is shown whose layers are connected to the positive and grounded negative pole of a direct voltage source across resistors 11 and 12 respectively, said resistors being of identical value. The two condenser layers are connected across the coupling condensers 13 and 14 to the two deflection plates 15 and 16 respectively, of a Braun or cathode ray tube 17. The deflection plates are connected to the anode 20 of the tube across two resistors 18, 19. There is furthermore connected in parallel to the condenser 10 the cathode anode path of the tube 21 which is connected to an oscillatory blocking circuit. As far as the explanation goes up to this point the circuit arrangement according to Fig. 2 corresponds to that according to Fig. 1 which represents my prior application. In order to apply the synchronizing impulses to the saw tooth generator the grid circuit of the tube 21 contains the RC member 22 and the secondary winding 23 of the transformer 24 joins load resistor 25 of a detector circuit designed as series rectifier. By means of the coil 26, the high frequency voltage is applied, while the diode 27 provides the detection and the condenser 28 serves for the filtering of the high frequency in the manner well known.

The arrangement of Fig. 2 generates a saw tooth shaped voltage in the manner described in connection with Fig. 1, which represented an embodiment of my invention described in application Serial Number 124,977, filed February 10, 1937. The energy stored in the condenser 10 discharges across the anode-cathode path of tube 21 and due to the grid current flowing, the condenser forming a part of the time constant circuit 22 becomes negatively charged on the side thereof which is connected to the grid of tube 21. This charge becomes at least partially dissipated while the tube 21 is blocked and before the receipt of a synchronizing pulse. In view of the fact that the video signals when rectified still further bias the grid of tube 21 negatively, there is effectively a superposition of this bias onto that due to the charge on the condenser of the time constant circuit 22. The synchronizing signals having a polarity opposite to that of the video signals, and the connections being so made that the rectified video signals bias the grid of tube 21 negatively, it is apparent then that the synchronizing signals which are opposite in polarity and will not be rectified will swing the grid of tube 21 more positively and hence the tube 21 may conduct. The time constant circuit 22 is so designed as to value that the charge on the condenser of the time constant circuit should disappear or be dissipated between synchronizing signal impulses. Due to the slow dissipation of the charge on the condenser in time constant circuit 22, the tube 21 will be blocked very effectively against disturbing impulses at least during the greater portion of the transmission time of a signal line of the picture, and the synchronizing signal being comparatively great in intensity, the tube 21 will be caused to conduct very rapidly upon the receipt of this signal.

Here it should be noted that with the arrangement shown in Fig. 2, discharging of the condenser 10 is accomplished at the natural frequency of the oscillatory blocking circuit even where line impulses do not arrive so that the arrangement is at least to a great degree self-synchronizing.

Referring to Fig. 3, there is shown a modification of the arrangement disclosed in Fig. 2. In this modification, a negative biasing voltage source is inserted between the grid of the tube 21 and the cathode thereof.

In the case of Fig. 4, the biasing voltage is inserted in the cathode lead per se. The introduction of these biasing grid voltage sources has the effect that during the variation of the potential of the condenser in the time constant circuit 22 while the accumulated charge thereof is being dissipated, the grid of tube 21 always will have a small negative bias relative to the value at which plate current begins to flow. The blocking circuit hence remains blocked when the synchronizing pulses are absent and is fully synchronized by the first of the received video impulses.

A circuit arrangement according to the invention can also be modified as indicated in Fig. 3 wherein a negative grid biasing voltage source is inserted between the grid of the oscillatory blocking tube 21 and the connection point A of the grid lead at the plate circuit, or when as shown in Fig. 4, such a biasing grid voltage source is inserted in the cathode lead-in of the tube 21. Otherwise these two circuits are understood to be formed as in the case of Fig. 2. The introduction of this biasing grid voltage source has the effect that through the passage of the potential at the RC member 22 the grid will have a potential which is by a small value negative relative to the value at which a plate current can set in. The oscillatory blocking circuit hence remains at rest when the synchronizing impulses are absent and is already again fully synchronized by the first of the newly arriving line impulses.

A constant negative grid biasing voltage in the sense of Figs. 3 and 4 can be produced by means of the RC members 29 and 30 represented in the Figs. 5 and 6 which are charged by the grid current and plate current respectively of the blocking oscillator, and receive a time constant which is a multiple of the line duration. The parts of the circuit not shown in the Figs. 5 and 6 are likewise again those of Fig. 2.

What I claim is:

1. An apparatus for generating oscillations of a serrated wave form under the control of impulses from a source external to the apparatus comprising a thermionic vacuum tube having anode, cathode and at least one control electrode, electrical energy storage means connected substantially in parallel with the space discharge path of said vacuum tube, a pair of resistive means of substantially equal value each connected to one terminal of said electrical energy storage means, a source of potential connected serially with said resistive means and said electrical energy storage means whereby the potential of each terminal of the condenser varies linearly, a first time constant circuit connected in the anode-cathode path and in a control electrode-cathode path of said thermionic tube, a second time constant circuit connected in a control electrode-cathode path of said tube, rectifying means, a third time constant circuit having current from said rectifying means impressed thereon, said latter circuit being connected in a control electrode-cathode path of said tube, means for impressing signals from an external source onto said rectifying means, and means for feeding back a portion of the energy in the anode-cathode circuit of said tube to a control electrode-cathode circuit of said tube.

2. Apparatus in accordance with claim 1, wherein the first time constant circuit has a period which is a multiple of the received impulses actuating the discharge of the energy stored in said electrical energy storage means.

ROBERT ANDRIEU.